(12) United States Patent
Ota

(10) Patent No.: US 7,898,612 B2
(45) Date of Patent: Mar. 1, 2011

(54) LIQUID CRYSTAL DISPLAY DEVICE WITH WIRING STRUCTURE

(75) Inventor: Yuzo Ota, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 163 days.

(21) Appl. No.: 12/409,567

(22) Filed: Mar. 24, 2009

(65) Prior Publication Data

US 2009/0244433 A1      Oct. 1, 2009

(30) Foreign Application Priority Data

Mar. 25, 2008    (JP) .............................. 2008-078152

(51) Int. Cl.
  *G02F 1/1333*    (2006.01)
  *G02F 1/1345*    (2006.01)
(52) U.S. Cl. ........................ 349/58; 349/150
(58) Field of Classification Search ............ 349/58, 349/59, 60, 61, 62, 65, 69, 70, 71, 73, 149, 349/150, 151
See application file for complete search history.

(56) References Cited

U.S. PATENT DOCUMENTS 5,946,062 A  *  8/1999  Hasegawa et al. ............. 349/58
6,388,722 B1 *  5/2002  Yoshii et al. .................. 349/62
7,048,418 B2 *  5/2006  Hur et al. ..................... 362/457

FOREIGN PATENT DOCUMENTS

| JP | 2007-007287 | * | 1/2007 |
| JP | 2007-007315 | * | 1/2007 |
| JP | 2007-007316 | * | 1/2007 |
| JP | 2007-037578 | * | 1/2007 |

* cited by examiner

*Primary Examiner*—T C Patel
*Assistant Examiner*—Sang Nguyen
(74) *Attorney, Agent, or Firm*—Antonelli, Terry, Stout & Kraus, LLP.

(57) ABSTRACT

A liquid crystal display panel is placed on an upper mold, and a liquid crystal shutter is stored in a lower mold. Fluorescent lamps serving as a light source are disposed along the internal surface of the lower mold. A display object is disposed on the back of the lower mold. Display images can be changed by switching signals to be applied to the liquid crystal shutter or liquid crystal display panel. The cables for the fluorescent lamps are laid in a groove-like concave section formed in the upper part of the lower mold. A flexible cable extended from the liquid crystal shutter is bonded to a notched portion of the upper part of the lower mold, and coupled to a printed circuit board disposed on the flank of the lower mold.

11 Claims, 7 Drawing Sheets

A-A     B-B     C-C

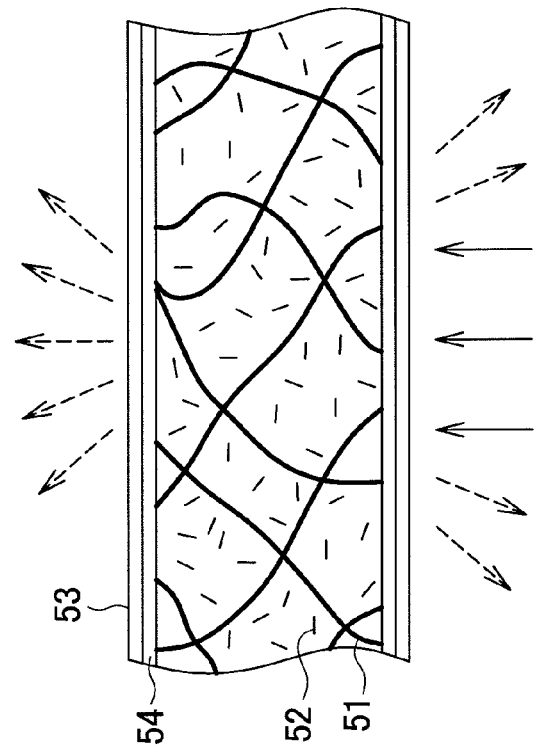
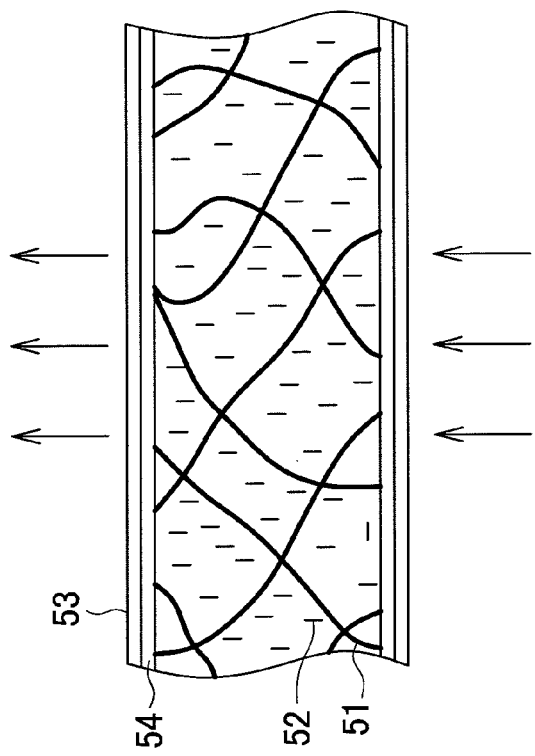

LIQUID CRYSTAL DISPLAY DEVICE WITH WIRING STRUCTURE

CROSS-REFERENCE TO RELATED APPLICATION

The present application claims priority from Japanese application JP2008-078152 filed on Mar. 25, 2008, the content of which is hereby incorporated by reference into this application.

BACKGROUND OF THE INVENTION

1. Field of the Invention

The present invention relates to a display device, or more particularly, to a liquid crystal display device capable of displaying an image formed on a liquid crystal display panel and a display object existent behind the liquid crystal display panel while switching the image and display object.

2. Description of the Related Art

The demand for liquid crystal display devices is growing in the application fields of not only a computer display and a portable cellular phone unit but also a television set because the display device can be thinned and the weight of the display device is limited. Since a liquid crystal display panel does not emit light by itself, a backlight is disposed on the back of the liquid crystal display panel in order to display an image. Light emanating from the backlight is controlled pixel by pixel, whereby an image is formed.

The liquid crystal display device can be applied to various display devices because it can be thinned. For the application to a game display, in addition to an image visualized by a liquid crystal, a specific image is requested to be displayed using the same liquid crystal screen. As a construction permitting such display, a liquid crystal shutter is disposed in a backlight portion. For displaying a normal liquid crystal screen image, the liquid crystal shutter is used as a diffuser. When a specific image or a display object disposed behind the liquid crystal shutter is displayed in place of an image formed on a liquid crystal display panel, the entire liquid crystal display panel is brought to a transmissive state. At the same time, a voltage is applied to the liquid crystal shutter, which is disposed behind the liquid crystal display panel, in order to bring the liquid crystal shutter to the transmissive state. This makes it possible to discern the display object disposed behind the liquid crystal shutter. In this case, a light source is located on the side of the liquid crystal shutter or the like for fear the discernment of the display object located behind the liquid crystal shutter may be hindered.

The foregoing technology is described in, for example, a patent document 1.

The patent document 1 refers to JP-A-2007-7315.

FIG. 7 is a sectional view of a display device capable of not only displaying an image on a normal liquid crystal display panel but also displaying a fixed image. In the display device shown in FIG. 7, an image formed in a liquid crystal display device is normally displayed. At this time, a liquid crystal shutter 50 disposed behind a liquid crystal display panel is de-energized. In this case, the liquid crystal display shutter 50 works as a diffuser for the liquid crystal display panel.

In the liquid crystal display device shown in FIG. 7, a display object 40 disposed behind the liquid crystal display panel may be displayed. In this case, all the pixels in the liquid crystal display panel are brought to a transmissive state. The liquid crystal shutter 50 is then energized and thus brought to the transmissive state. Since both the liquid crystal display panel and liquid crystal shutter 50 become transmissive, the display object 40 can be discerned from outside the liquid crystal display panel.

As mentioned above, a voltage to be applied to the liquid crystal shutter 50 has to be varied depending on whether an image on the liquid crystal display panel is displayed or the display object 40 is displayed. In order to apply a voltage to the liquid crystal shutter 50, a flexible cable 80 is employed as shown in FIG. 7.

Assembling the components of the display device shown in FIG. 7 is carried out as described below. To begin with, a liquid crystal display panel is disposed in an upper mold 60. Cold-cathode fluorescent lamps (CCFL) 30 and cables 31 for the CCFLs 30 are disposed in a lower mold 65. The cables 31 for the CCFLs 30 are laid to encircle the internal surface of the display device by creating a space on the side of the lower mold 65 behind the CCFLs 30. This brings about a drawback that the contour of the display device gets large.

After the CCFLs 30 and cables 31 are disposed in the lower mold 65, the liquid crystal shutter 50 is placed on the lower mold 65. As mentioned above, a voltage has to be applied in order to energize or de-energize the liquid crystal shutter 50. For the application of the voltage, the flexible cable 80 is employed. The flexible cable 80 is coupled to a printed circuit board (PCB) 75 made of a glass epoxy resin or the like.

The upper mold 60 and lower mold 65 that are formed as mentioned above have to be assembled. In the conventional construction shown in FIG. 7, the flexible cable 80 attached to the liquid crystal shutter 50 is unstable. This poses a problem in that the flexible cable 80 is entangled into the lower mold 65 during assembling, and causes a defective product. Even after the components are assembled as a product, the flexible cable 80 is held unstable. If the product undergoes an impact, there is a fear that such a defect that the flexible cable 80 peels off from the liquid crystal shutter 50 or PCB 75 may take place.

In the related art, the liquid crystal shutter 50 is sandwiched between the upper mold 60 and lower mold 65, and secured by pressing the upper mold 60 against the lower mold 65 using a frame 70. In such a construction, if a completed liquid crystal display device undergoes an impact or the like, the liquid crystal shutter 50 is displaced.

SUMMARY OF THE INVENTION

A liquid crystal display device includes a liquid crystal display panel placed on an upper mold, a liquid crystal shutter disposed behind the upper mold and stored in a lower mold, fluorescent lamps disposed in the lower mold, and a display object disposed on the back of the lower mold. For displaying an image formed on the liquid crystal display panel, the liquid crystal shutter is set to a mode in which the liquid crystal shutter becomes cloudy to scatter light. For displaying the display object or a specific image, the liquid crystal shutter is set to a mode in which the liquid crystal shutter transmits light. The fluorescent lamps are disposed along the internal wall of the lower mold, and cables for the fluorescent lamps are laid in the upper part of the lower mold.

BRIEF DESCRIPTION OF THE DRAWINGS

3A is a plan view, FIG. 3B is a sectional view along a A-A cutting plane line shown in FIG. 3A, FIG. 3C is a sectional view along a B-B cutting plane line shown in FIG. 3A, and FIG. 3D is a sectional view along a C-C cutting plane line shown in FIG. 3A;

FIG. 5A and FIG. 5B are diagrams showing the principles of the liquid crystal shutter, FIG. 5A is a sectional illustrative diagram showing the liquid crystal shutter to which no voltage is applied, and FIG. 5B is a sectional illustrative diagram showing the liquid crystal shutter to which a voltage is applied;

DESCRIPTION OF THE PREFERRED EMBODIMENT

Figure 1:
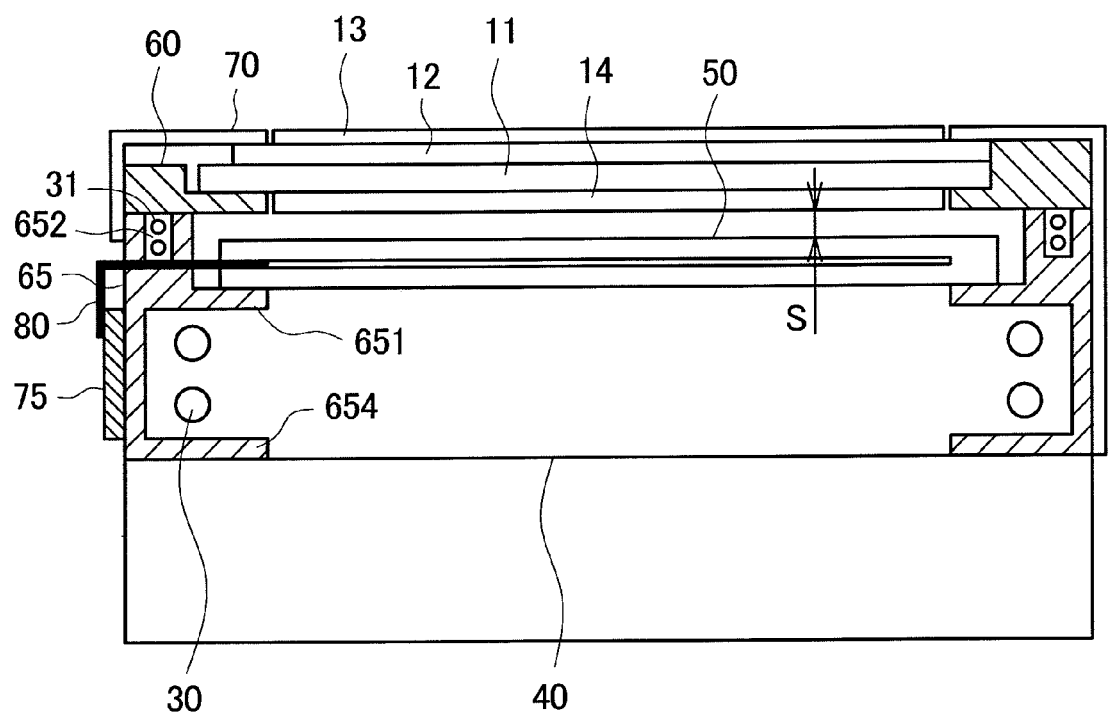
FIG. 1 is a sectional view showing an embodiment of the present invention.

The present invention is intended to solve the aforesaid problems. Pieces of concrete means will be described below.

(1) A liquid crystal display device includes a liquid crystal display panel placed on an upper mold, a liquid crystal shutter disposed behind the upper mold and stored in a lower mold, and fluorescent lamps disposed in the lower mold.

The liquid crystal display device supports an image display mode in which an image formed on the liquid crystal display panel is displayed and a transmissive mode in which an entity located behind the liquid crystal display panel can be seen through.

In the image display mode, the liquid crystal shutter becomes cloudy to scatter light.

In the transmissive mode, the liquid crystal shutter transmits light emanating from behind the liquid crystal shutter.

The fluorescent lamps are located behind the liquid crystal shutter, and disposed along the internal wall of the lower mold.

The cables for the fluorescent lamps are laid in the upper part of the lower mold.

(2) The liquid crystal display device mentioned in (1) is characterized in that the fluorescent lamps are cold-cathode fluorescent lamps (CCFLs) shaped like the letter L.

(3) The liquid crystal display device mentioned in (1) is characterized in that the cables are laid in a groove-like concave section formed on the upper side of the lower mold.

(4) The liquid crystal display device mentioned in (1) is characterized in that: a space is interposed between the liquid crystal display panel and liquid crystal shutter; and the space is sustained by the lower mold.

(5) The liquid crystal display device mentioned in (1) is characterized in that a three-dimensional display object is disposed behind the liquid crystal shutter.

(6) A liquid crystal display device includes a liquid crystal display panel placed on an upper mold, a liquid crystal shutter disposed behind the upper mold and stored in a lower mold, fluorescent lamps disposed in the lower mold, and a display object disposed on the back of the lower mold. For displaying an image formed on the liquid crystal display panel, the liquid crystal shutter is set to a mode in which the liquid crystal shutter becomes cloudy to scatter light. For displaying the display object, the liquid crystal shutter is set to a mode in which the liquid crystal shutter transmits light. The cables for the fluorescent lamps are laid in the upper part of the lower mold. A flexible cable is coupled to the liquid crystal shutter. The flexible cable is extended to outside the lower mold along the upper part of the lower mold. The cables for the fluorescent lamps are laid on the flexible cable.

(7) The liquid crystal display device mentioned in (6) is characterized in that the flexible cable is coupled to a printed circuit board (PCB) disposed on the flank of the lower mold.

(8) The liquid crystal display device mentioned in (6) is characterized in that the fluorescent lamps are CCFLs shaped like the letter L.

(9) A liquid crystal display device includes an upper mold on which a liquid crystal display panel is placed and a lower mold in which a liquid crystal shutter and fluorescent lamps are stored, and has the lower mold disposed on the back side of the upper mold. The liquid crystal display device supports an image display mode in which an image formed on the liquid crystal display panel is displayed and a transmissive mode in which an entity located behind the liquid crystal display panel can be observed. In the image display mode, the liquid crystal shutter becomes cloudy to scatter light. In the transmissive mode, the liquid crystal shutter transmits light emanating from behind the liquid crystal shutter. The cables for the fluorescent lamps are disposed in a groove defined with an internal wall and an external wall formed in the upper part of the lower mold. The upper part of the lower mold in which the groove is defined has a notched portion. A flexible cable is coupled to the liquid crystal shutter. The flexible cable is extended to outside through the notched portion in the upper part of the lower mold. The flexible cable is interposed between the cables for the fluorescent lamps and the lower mold.

(10) The liquid crystal display device mentioned in (9) is characterized in that the flexible cable is coupled to a PCB disposed on the flank of the lower mold.

(11) The liquid crystal display device mentioned in (9) is characterized in that the fluorescent lamps are CCFLs shaped like the letter L.

(12) A liquid crystal display device of the present invention includes an upper mold on which a liquid crystal panel is placed and a lower mold in which a liquid crystal shutter and fluorescent lamps are stored. The lower mold is disposed on the back of the upper mold. A display object can be disposed on the back of the lower mold. For displaying an image formed on the liquid crystal display panel, the liquid crystal shutter is set to a mode in which the liquid crystal shutter becomes cloudy to scatter light. For displaying the display object or a specific image, the liquid crystal shutter is set to a mode in which the liquid crystal shutter transmits light. The fluorescent lamps are disposed along the internal wall of the lower mold, and the cables for the fluorescent lamps are laid in the upper part of the lower mold.

In the present invention, since the cables for the fluorescent lamps disposed on the internal surface of the lower mold are laid in the upper part of the lower mold, the contour of the liquid crystal display device can be reduced. The cables for the fluorescent lamps are laid in the groove-like concave section formed in the upper part of the lower mold, and the walls with which the groove is defined in the upper part of the lower mold are used to determine the distance between the liquid crystal display panel and liquid crystal shutter. Therefore, the entire display device can be prevented from being thick. Since the liquid crystal shutter is stored in the lower mold, the liquid crystal shutter can be prevented from being displaced due to an impact or the like after completion of the liquid crystal display device.

The liquid crystal shutter is stored in the lower mold, and the flexible cable coupled to the liquid crystal shutter is extended to outside along the lower mold. The cables for the fluorescent lamps are laid on the flexible cable. Therefore, the flexible cable can be disposed stably, and the upper mold and lower mold can be assembled readily. In addition, the flexible cable can be prevented from being peeled off due to an impact or the like after the liquid crystal display device is completed.

The detailed contents of the present invention will be disclosed below by introducing an embodiment.

FIG. 1 is a sectional view showing an embodiment of the present invention. In FIG. 1, a liquid crystal display panel is placed on an upper mold 60. The liquid crystal display panel includes a thin-film transistor (TFT) substrate 11 having pixel electrodes, TFTs, and others formed therein, and an opposite substrate 12 having color filters or the like formed therein. A liquid crystal is sandwiched between the TFT substrate 11 and opposite substrate 12. A lower polarizer 14 is bonded to the bottom of the TFT substrate 11, and an upper polarizer 13 is bonded to the top of the opposite substrate 12.

The TFT substrate 11 is formed to be slightly larger than the opposite substrate 12. A terminal section via which power, a signal, or the like is fed to the liquid crystal display panel is formed in a portion of the TFT substrate 11 that exists by itself. The terminal section is coupled to a flexible wiring substrate that is not shown, and connected to an external circuit.

In FIG. 1, the flexible wiring substrate that is not shown is coupled to the TFT substrate 11, and connected to a printed circuit board (PCB) 75, which is disposed on the flank of a lower mold 65 and made of a glass epoxy resin, by way of the top of the upper mold 60 and the flank thereof. A flexible cable 80 extended from a liquid crystal shutter 50 is also, as described later, coupled to the PCB 75.

The liquid crystal shutter 50 is stored in the lower mold behind the liquid crystal display panel. FIG. 5A and FIG. 5B show the principles of operation of the liquid crystal shutter 50. In FIG. 5A and FIG. 5B, the liquid crystal shutter 50 exerts such an operation that: when a voltage is applied to the liquid crystal shutter 50, the liquid crystal shutter 50 transmits light; and when the application of the voltage is ceased, the liquid crystal shutter 50 scatters light. FIG. 5A is a sectional illustrative diagram of the liquid crystal shutter 50 to which no voltage is applied. In FIG. 5A, a liquid crystal is interposed between plastic substrates 53. In addition, polymeric macromolecules 51 are composed like a network, and liquid crystalline molecules 52 are irregularly arranged among the polymeric macromolecules in plastic substrates 53. In the state shown in FIG. 5A, the irregularly arranged liquid crystalline molecules 52 scatter light, and the liquid crystal shutter 50 is cloudy. The liquid crystal shutter 50 in this state exerts the same operation as the operation of a diffuser. A transparent electrode 54 realized with an indium-tin-oxide (ITO) film or the like is formed on the internal side of each of the plastic substrates 53.

In the state shown in FIG. 5A, a display object 40 disposed on the back of the lower mold cannot be discerned from ahead of the liquid crystal display panel. Therefore, when a voltage is not applied to the liquid crystal shutter 50, the liquid crystal display device shown in FIG. 1 acts as a normal liquid crystal display device, and an image formed on the liquid crystal display panel is discerned.

FIG. 5B shows a state in which a voltage is applied to the transparent electrodes 54 formed on the internal sides of the plastic substrates 53. When a voltage is applied across the upper and lower transparent electrodes 54, the liquid crystalline molecules 52 are, as shown in FIG. 5B, aligned in an up-and-down direction, and light is transmitted by the liquid crystal shutter 50.

In the state in which a voltage is applied to the liquid crystal shutter 50 and light is transmitted by the liquid crystal shutter 50, all the pixels in the liquid crystal display panel shown in FIG. 1 are transmissive. Namely, white display is attained.

Since both the liquid crystal display panel and liquid crystal shutter 50 are transmissive, the display object 40 disposed behind the liquid crystal shutter 50 is discernible. The display object 40 disposed behind the liquid crystal shutter 50 may be a movable entity of amusement equipment or a three-dimensional entity. Hereinafter, even when the display object 40 refers to the three-dimensional entity, the display object may be called a specific image 40.

For energizing the liquid crystal shutter 50 shown in FIG. 5, a pulsating voltage whose value is switched from a positive value to a negative value or vice versa at intervals of milliseconds is applied across the upper and lower transparent substrates. This is because the application of a direct-current voltage causes a liquid crystal to electrically decompose and deteriorate. When no voltage is applied to the liquid crystal shutter 50, the liquid crystalline molecules are oriented in random directions, and light is scattered.

The plastic substrates that sandwich, as shown in FIG. 5, a liquid crystal are thin and low in strength. The liquid crystal existent in the liquid crystal shutter 50 degenerates on receipt of ultraviolet rays. A transparent plastic resin having the ability to intercept ultraviolet rays is adopted in order to mechanically reinforce the liquid crystal shutter 50 and protect the liquid crystal from the ultraviolet rays. For example, an acrylic resin is adopted as the transparent plastic resin, and used in the form of a sheet. In order to apply a voltage across the upper and lower transparent substrates of the liquid crystal shutter 50, the flexible cable 80 is coupled to the upper and lower transparent electrodes 54 in the liquid crystal shutter 50 and extended to outside.

Figure 6:
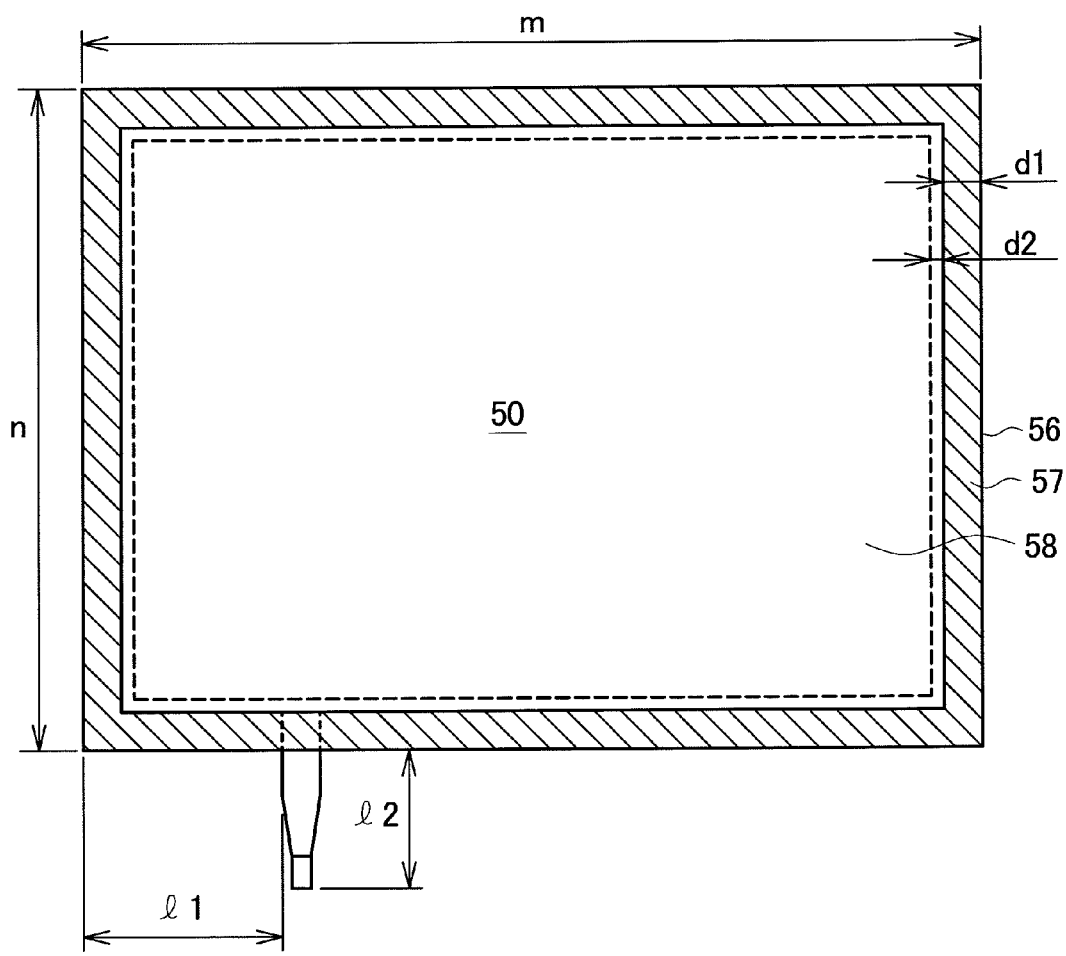
FIG. 6 is a plan view of the liquid crystal shutter.

FIG. 6 is a plan view of an ultraviolet interceptive liquid crystal shutter 50. In FIG. 6, the contour of the ultraviolet interceptive liquid crystal shutter 50 is identical to the contour of acrylic sheets 56. In the present embodiment, the major axis m is 278 mm long and the minor axis n is 173 mm long. As shown in FIG. 6, the acrylic sheets 56 have the perimeters thereof bonded to each other with a double-sided adhesive substance. The adhesive substance is black and has a width d1 of 4.5 mm. In FIG. 6, an area defined with a dashed line corresponds to an area in the liquid crystal shutter 50 in which light is transmitted or diffused. The area will be referred to as a transmissive area 58. The transmissive area 58 is associated with a display area in the liquid crystal display panel. A reference numeral d2 in FIG. 6 denotes a distance from an edge of the double-sided adhesive substance, with which the two acrylic sheets 56 are bonded, to an edge of the transmissive area 58. A sealing member 59 with which the liquid crystal in the liquid crystal shutter 50 is sealed is formed in an area whose width corresponds to the distance d2. The distance d2 is, for example, on the order of 2.5 mm.

In FIG. 6, the flexible cable 80 coupled to the upper and lower transparent electrodes 54 of the liquid crystal shutter 50 penetrates through the adhesive section realized with an adhesive section including a double-sided adhesive tape 57 and extends to outside. The flexible table 80 is, as described later, coupled to the PCB 75 disposed on the flank of the lower mold 65 and made of a glass epoxy resin. Therefore, the flexible cable 80 is relatively long. A length l2 in FIG. 6 is approximately 23 mm. The distal end of the flexible cable 80 has a terminal formed so that the flexible cable can be coupled to the PCB 75.

As mentioned above, since the flexible cable 80 is long, the related art suffers the fact that since the position of the flexible cable 80 is not stabilized, it takes much time to assemble the upper mold 60 and lower mold 65, or a fear that after the liquid crystal display device is completed, if an impact is applied to the liquid crystal display device, the flexible cable 80 may peel off. In the present invention, as described later, since the flexible cable 80 is fixed to the lower mold 65, the flexible cable 80 is stably disposed.

The flexible cable 80 is located in a place near one side of each of the acrylic sheets 56 away from the center thereof. A distance l1 from a short side of each of the acrylic sheets 56 in the present embodiment is, for example, on the order of 74 mm. The flexible wiring substrate that is extended from the liquid crystal display panel and is not shown is also coupled to the PCB 75, which is disposed on the flank of the lower mold 65, by way of the flank of the upper mold 60. Since the flexible cable 80 extended from the liquid crystal shutter 50 is disposed near the short side of each of the acrylic sheets, the flexible cable 80 extended from the liquid crystal shutter 50 and the flexible wiring substance extended from the liquid crystal display panel can be readily coupled to the PCB 75 at the same time. Needless to say, the position of the flexible cable 80 of the liquid crystal shutter 50 is not limited to the foregoing one.

Referring back to FIG. 1, the ultraviolet interceptive liquid crystal shutter 50 (which hereinafter will be simply called the liquid crystal shutter 50) is placed in the lower mold 65. Since the liquid crystal shutter 50 is inserted into a concave section formed in the lower mold 65, the wall of the lower mold 65 acts as a stopper. Therefore, the liquid crystal shutter 50 will not be displaced due to an impact or the like.

A concave section is formed in the internal wall of the lower part of the lower mold 65. Cold-cathode fluorescent lamps (CCFLs) 30 are disposed in the concave section so that two CCFLs will be aligned in a vertical direction. The CCFLs 30 fill the role of a backlight for the liquid crystal display panel. The CCFLs 30 serve as a light source for the specific image 40 disposed on the back of the lower mold 65. Light reflected from the display object 40 passes through the liquid crystal shutter 50 and liquid crystal display panel, and is discerned from ahead of the liquid crystal display panel.

A backlight in a normal liquid crystal display device is composed of a light source and various optical components in order to concentrate light, which emanates from the backlight, on a liquid crystal display panel side as efficiently as possible. For example, when the light source is disposed on the side of the lower mold in the same manner as it is in the present embodiment, a light guide plate to be used to orient light, which emanates from the light source, to the liquid crystal display panel, a diffusive sheet to be used to homogenize light, and a prism sheet to be used to make light more directional to the liquid crystal display panel side are needed.

However, in the present embodiment, the foregoing optical components cannot be used because the presence of the optical components disables the discernment of the display object 40 disposed on the back of the lower mold. Therefore, in the present embodiment, the optical components are not employed. However, the CCFLs 30 are disposed so that two CCFLs will be layered up and down, and are extended along the entire internal surface of the lower mold 65. This is intended to route a sufficient amount of light to the display object 40 or liquid crystal display panel as uniformly as possible. In order to uniformly route light to the liquid crystal display panel, light has to be uniformly introduced to the liquid crystal shutter 50. This is because: for displaying an image formed on the liquid crystal display panel, the liquid crystal shutter 50 fills the role of a diffuser; and a luminance distribution of light incident on the liquid crystal shutter 50 is reflected on a luminance distribution in an image displayed on the liquid crystal display panel.

Figure 2:
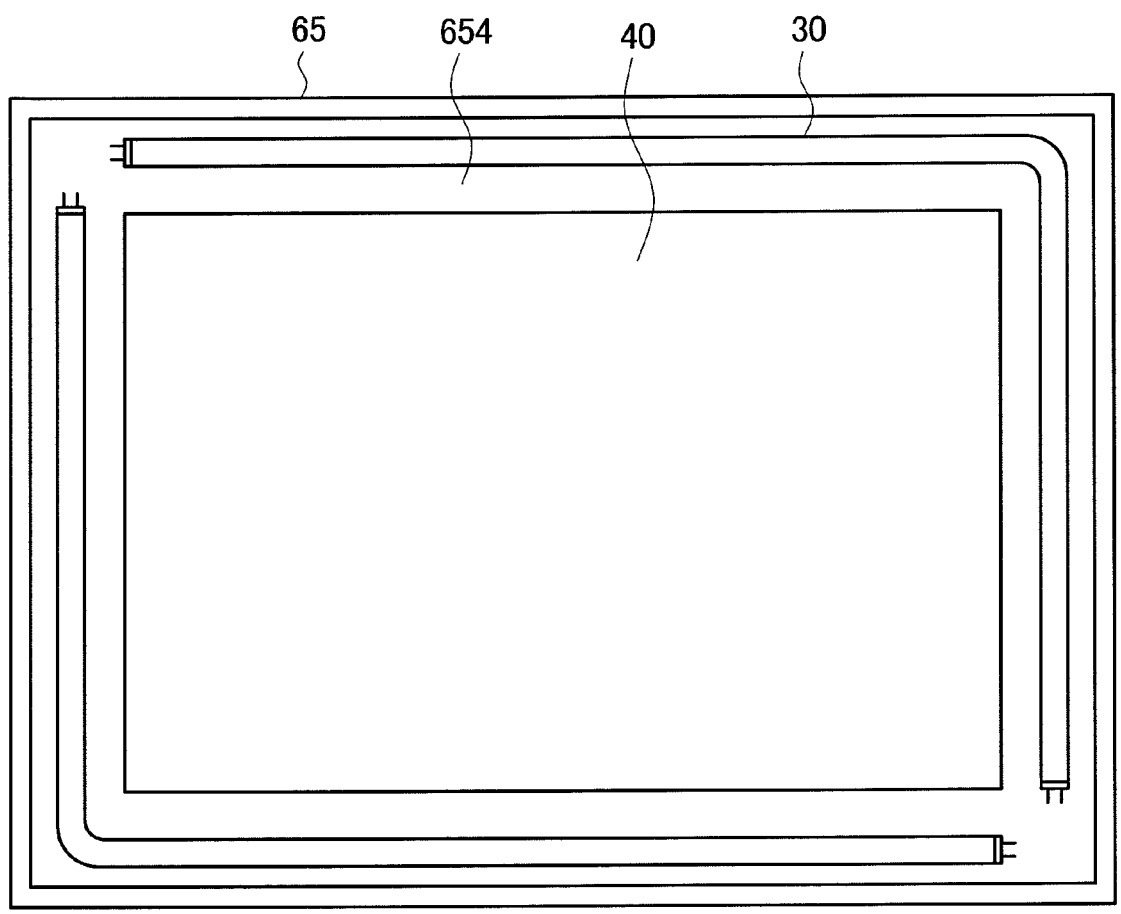
FIG. 2 shows the disposition of CCFLs in the embodiment of the present invention.

FIG. 2 shows a case where the CCFLs 30 are disposed along the entire internal surface of the lower mold. FIG. 2 is a plan view showing only the portion of the lower mold 65 in which the CCFLs 30 are disposed. In FIG. 2, the CCFLs 30 are placed on a lower flange 654 of the lower mold 65. The CCFLs 30 are shaped like the letter L. By disposing two L-shaped CCFLs 30, a light source can be formed along the entire internal surface of the lower mold 65. The plugs of the CCFLs 30 are located at the corners of the lower mold 65. In reality, as shown in FIG. 1, the CCFLs 30 are disposed so that two CCFLs will be layered in a vertical direction.

The CCFLs 30 have the plugs thereof located at the corners of the lower mold. Cables 31 over which a current is fed to the CCFLs 30 have to be led out from the plugs. In the related art shown in FIG. 7, the cables 31 for the CCFLs 30 are disposed in a concave section formed in the periphery of the lower mold 65. However, the liquid crystal display device of the present embodiment, that is, a display device that displays both an image on the liquid crystal display panel and the display object 40 disposed on the back of the lower mold is largely requested to have as large a display screen as possible and have as small a contour as possible. In the related art shown in FIG. 7, it is hard to meet the request.

In the present embodiment, as shown in FIG. 1, a groove-like concave section 652 is formed at the upper portion of the under mold 65, and the cables 31 for the CCFLs 30 are put in the concave section 652. Owing to the arrangement, the contour of the lower mold 65, that is, the contour of the liquid crystal display device can be prevented from getting larger. Since the concave section 652 is formed in the upper part of the lower mold 65, there is a concern that the height of the lower mold 65 may get larger.

Figure 7:
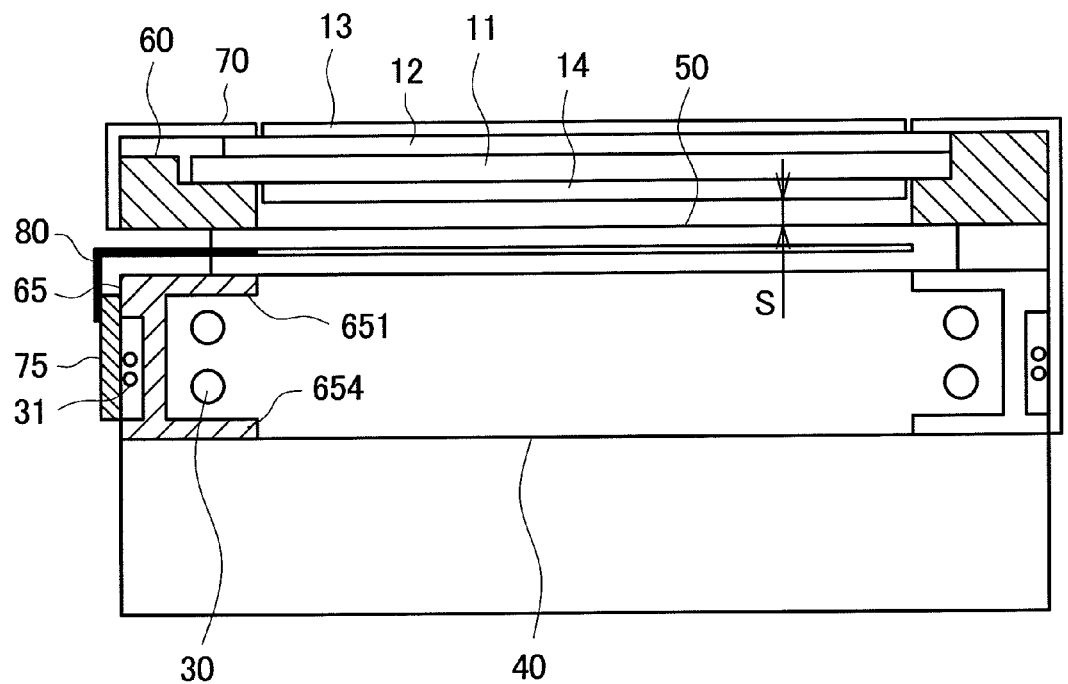
FIG. 7 is a sectional view showing a related art.

When the related art shown in FIG. 7 and the embodiment of the present invention shown in FIG. 1 are compared with each other, the related art has the liquid crystal shutter 50 sandwiched between the upper mold 60 and lower mold 65. In the related art shown in FIG. 7, the thickness of the liquid crystal display device excluding the display object 40 is the sum between the thicknesses of the upper mold 60 and lower mold and the thickness of the liquid crystal shutter 50. In contrast, in the present embodiment shown in FIG. 1, although the height of the lower mold 65 is increased upward, since the liquid crystal shutter 50 is stored in the lower mold 65, the height of the liquid crystal display device is substantially not increased at all.

Even in the related art shown in FIG. 7 and even in the present embodiment shown in FIG. 1, the space s between the liquid crystal display panel and liquid crystal shutter 50 is needed. The space s is approximately 2 mm. In the related art shown in FIG. 7, the thickness of the lower part of the upper mold 60 is increased in order to preserve the space s. In the present embodiment shown in FIG. 1, the upper side of the lower mold 65 is made thicker in order to preserve the spaces. Namely, the effect of the space s on the overall thickness of the liquid crystal display device remains unchanged between the related art in FIG. 7 and the present embodiment in FIG. 1.

The thickness of the liquid crystal shutter 50 is on the order of 5 mm, and the space between the liquid crystal shutter 50 and liquid crystal display panel is 2 mm. Therefore, 7 mm can be preserved as the depth of the concave section 652 that is shown in FIG. 1 and that is used to store the cables 31. Inversely, as long as the depth of the concave section 652 to be used to store the cables 31 falls within 7 mm, the thickness of the liquid crystal display device may not be larger than that of the related art.

In the related art shown in FIG. 7, the space s between the liquid crystal display panel and liquid crystal shutter 50 is sustained by the upper mold 60. In contrast, in the embodiment of the present invention shown in FIG. 1, the space s is sustained by the lower mold 65. In the lower mold 65, the groove-like concave section 652 is formed in a portion in which the space s is sustained, and the cables 31 for the CCFLs are laid in the portion. Owing to the construction, the overall thickness of the display device is prevented from increasing.

Figure 3A:
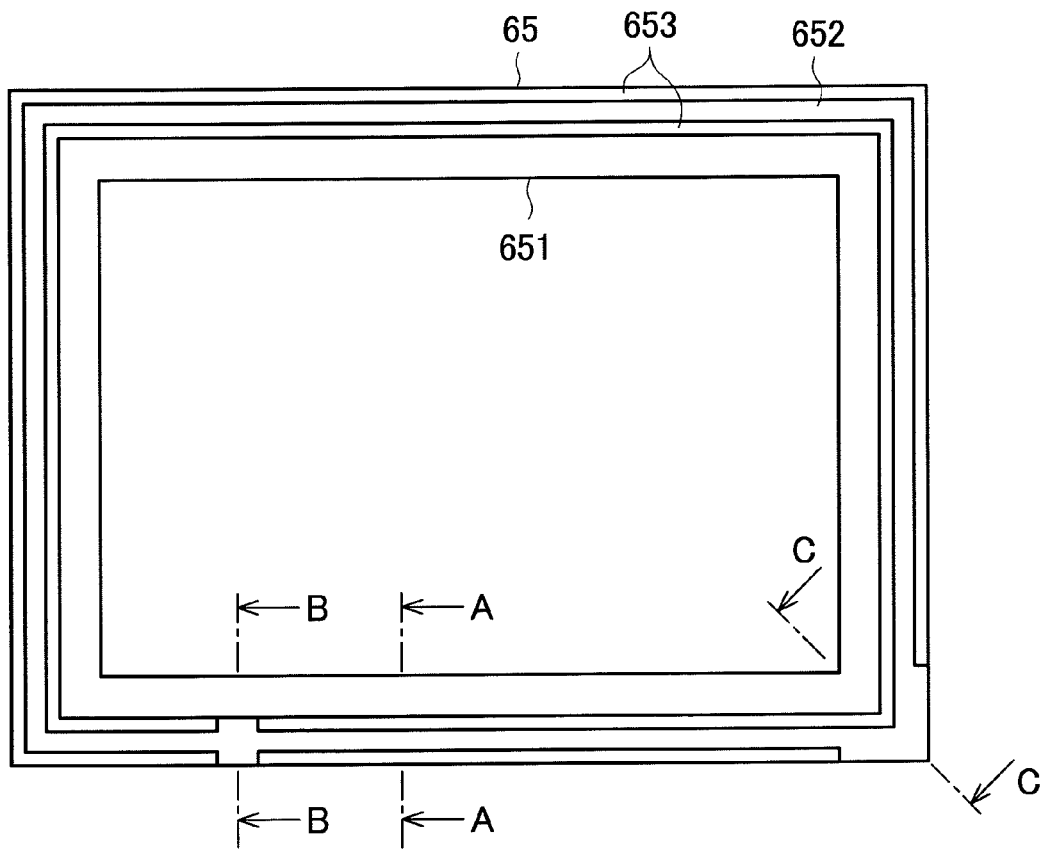
FIG. 3A, FIG. 3B, FIG. 3C, and FIG. 3D are diagrams showing the shape of a lower mold in the embodiment, FIG.
Figures 3B, 3C, 3D:
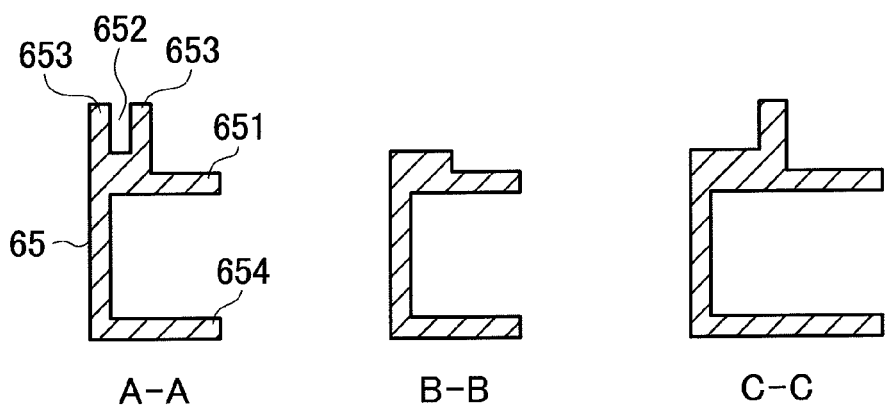

FIG. 3A, FIG. 3B, FIG. 3C, and FIG. 3D are diagrams showing the shape of the lower mold 65 in the present embodiment. FIG. 3A is a plan view, FIG. 3B is a sectional view along a I-I cutting plane line shown in FIG. 3A, FIG. 3C is a sectional view along a II-II cutting plane line shown in FIG. 3A, and FIG. 3D is a sectional view along a III-III cutting plane line shown in FIG. 3A. In FIG. 3A, the shape of the lower mold 65 is almost like a square frame, and is internally hollowed. The liquid crystal shutter 50 is placed on an upper flange 651. The CCFLs 30 are disposed below the upper flange 651.

The concave section 652 is formed like a groove in the majority of the upper part of the lower mold shown in FIG. 3A. FIG. 3B shows the concave section 652. In FIG. 3B, the concave section 652 is formed between internal and external walls 653. The cables for the CCFLs 30 are stored in the concave section 652 shown in FIG. 3A and FIG. 3B. The walls 653 in the upper part of the lower mold 65 are partly excluded, and the concave section 652 is not formed in the portion of the upper part of the lower mold in which the walls 653 are excluded. FIG. 3C that is a sectional view along the II-II cutting plane line shown in FIG. 3A shows the sectional shape of the portion of the upper part of the lower mold.

The flexible cable 80 extended from the liquid crystal shutter 50 is bonded to the top of the portion of the upper part of the lower mold whose section is shown in the sectional view of FIG. 3C. When the flexible cable 80 is not bonded, the flexible cable 80 is extended along the top of the portion of the upper part of the lower mold whose section is shown in FIG. 3C. In the present embodiment, the flexible cable 80 is bonded to the lower mold 65 or extended along the lower mold 65. Therefore, the flexible cable 80 can be stably disposed. After the flexible cable 80 is incorporated in the liquid crystal display device, the flexible cable 80 will be strong against an impact or the like to be imposed on the liquid crystal display device. In addition, assembling the components of the liquid crystal display device can be readily achieved. The cables 31 for the CCFLs 30 are placed on the flexible cable 80 in the portion of the upper part of the lower mold shown in FIG. 3C.

FIG. 3D is a sectional view along a III-III cutting plane line shown in FIG. 3A, and shows a section of a corner of the lower mold. Out of the walls 653 formed in the lower mold 65, the external wall 653 is excluded at the corner. This is intended to lead out the cables 31 for the CCFLs 30 to outside at the corner.

Figure 4:
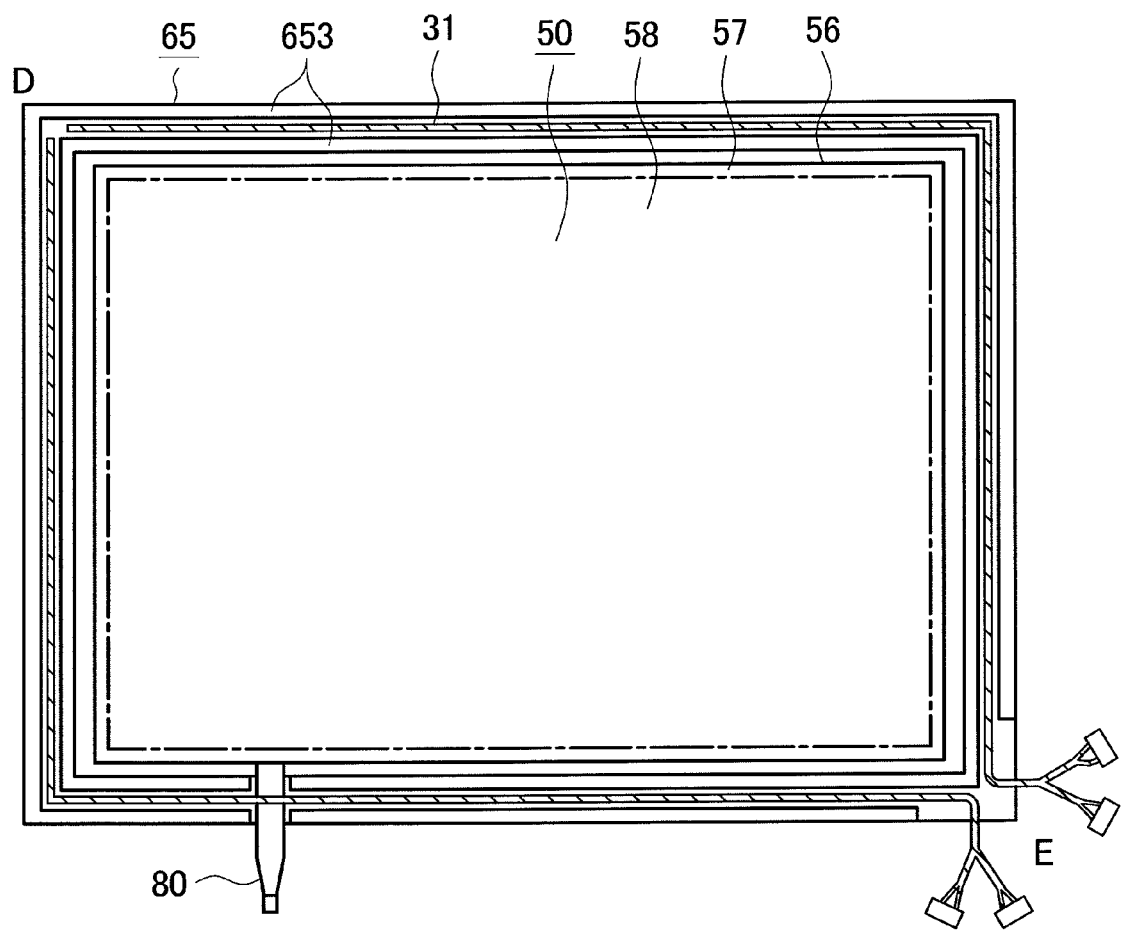
FIG. 4 is a plan view showing a liquid crystal shutter, a flexible cable, and CCFL cables placed on the lower mold.

FIG. 4 is a plan view showing a state in which the liquid crystal shutter 50 is placed in the lower mold 65 shown in FIG. 3 and the cables 31 for the CCFLs 30 are stored therein. The CCFLs 30 that are not shown are disposed below the upper flange 651 of the lower mold 65. As the CCFLs 30, the L-shaped CCFLs 30 are disposed as described in conjunction with FIG. 2. The CCFLs 30 are, as shown in FIG. 1, disposed in two layers, and four CCFLs are therefore employed in total. Eight cables are therefore needed as the cables 31 for the CCFLs 30.

The plugs of the CCFLs 30 are present at corners D and E shown in FIG. 4. Four cables are led out from the corner D shown in FIG. 4 to the upper side of the frame 70, and four cables are led out from the corner E to the upper side of the frame 70. The number of cables run through the concave section 652 formed in the upper part of the lower mold 65 is four. The cables 31 for the CCFLs 30 that come to eight in total are spliced to four CCFL connectors at the corner E.

In FIG. 4, the liquid crystal shutter 50 is placed on the upper flange 651 of the lower mold 65 that is not shown. An internal area defined with a dot-dash line represents the transmissive area 58 of the liquid crystal shutter 50 that is associated with the display area of the liquid crystal display panel. The liquid crystal shutter 50 is stored in the frame of the lower mold 65. After the liquid crystal shutter is incorporated in the liquid crystal display device, even if the liquid crystal display device undergoes an impact or the like, the liquid crystal shutter 50 will not be displaced. In FIG. 4, the acrylic sheets 56 of the liquid crystal shutter 50 are seen. The double-sided adhesive tape 57 used to bond the two acrylic sheets 56 is interposed between the perimeters of the acrylic sheets 56.

The flexible cable 80 over which a voltage is applied to the liquid crystal shutter 50 penetrates through the adhesive section including the double-sided adhesive tape 57 and extends from inside to outside. The portion of the upper part of the lower mold 65, through which the flexible cable 80 is led out, does not have the concave section 652, that is, the walls 653, but is formed as a notched portion. The flexible cable 80 is smoothly bonded to the upper part of the lower mold 65. The flexible cable 80 may be bonded to the upper part of the lower mold 65 or may be merely placed in the upper part of the lower mold 65. In either case, it is essential that the flexible cable 80 is extended along the flat portion of the upper part of the lower mold 65. In the upper part of the lower mold 65, the cables 31 for the CCFLs 30 are disposed on the flexible cable 80.

The flexible cable 80 is folded and coupled to the PCB 75 disposed on the flank of the lower mold 65. In the construction of the present embodiment, disposition of the liquid crystal shutter 50, leading out of the flexible cable 80, and others can be achieved stably with high reliability. Since the cables for the CCFLs 30 are laid in the upper part of the lower mold 65, the contour of the liquid crystal display device can be suppressed to be small. Further, since the liquid crystal shutter 50 is incorporated in the frame of the lower mold 65, an increase in the overall thickness of the liquid crystal display device can be suppressed. Since the liquid crystal shutter 50 is incorporated in the frame of the lower mold 65, after the liquid crystal display device is completed, the liquid crystal shutter 50 can be prevented from being displaced due to an impact or the like.

In the present embodiment, the CCFLs 30 serving as a light source are described to be shaped like the letter L. The adoption of the L shape is attributable to the facts that the number of cables 31 for the CCFLs 30 can be decreased, and that the cables 31 for the CCFLs 30 can be conveniently laid in the upper part of the lower mold 65. However, as long as a space large enough to wire in the upper part of the lower mold 65 can be preserved, the shape of the CCFLs 30 is not limited to the L shape. A method of disposing four linear CCFLs along the entire internal surface of the lower mold may be adopted. In the aforesaid embodiment, the CCFLs 30 are adopted as the light source. The present invention is not limited to the CCFLs. As the light source of the present invention, hot-cathode discharge tubes may be adopted.

What is claimed is:
1. A liquid crystal display device comprising:
a liquid crystal display panel placed on an upper mold;
a liquid crystal shutter disposed behind the upper mold and stored in a lower mold; and
fluorescent lamps disposed in the lower mold, wherein:

the liquid crystal display device supports an image display mode in which an image formed on the liquid crystal display panel is displayed and a transmissive mode in which an entity located behind the liquid crystal display panel can be observed;

in the image display mode, the liquid crystal shutter becomes cloudy to scatter light;

in the transmissive mode, the liquid crystal shutter transmits light;

the fluorescent lamps are located behind the liquid crystal shutter and disposed along the internal wall of the lower mold; and the cables for the fluorescent lamps are laid in the upper part of the lower mold.

2. The liquid crystal display device according to claim 1, wherein the fluorescent lamps are cold-cathode fluorescent lamps shaped like the letter L.

3. The liquid crystal display device according to claim 1, wherein the cables are laid in a groove-like concave section formed on the upper side of the lower mold.

4. The liquid crystal display device according to claim 1, wherein a space is preserved between the liquid crystal display panel and liquid crystal shutter, and the space is sustained by the lower mold.

5. The liquid crystal display device according to claim 1, wherein a three-dimensional display object is disposed behind the liquid crystal shutter.

6. A liquid crystal display device comprising:

a liquid crystal display panel placed on an upper mold;

a liquid crystal shutter disposed behind the upper mold and stored in a lower mold;

fluorescent lamps disposed in the lower mold; and a display object disposed on the back of the lower mold, wherein:

the liquid crystal shutter having scattering mode and transmittance mode, the liquid crystal shutter is set to the scattering mode in which the liquid crystal shutter becomes cloudy to scatter light;

the liquid crystal shutter is set to the transmittance mode in which the liquid crystal shutter transmits light;

the cables for the fluorescent lamps are laid in the upper part of the lower mold;

a flexible cable is coupled to the liquid crystal shutter, and the flexible cable is extended to outside the lower mold along the upper part of the lower mold; and the cables for the fluorescent lamps are laid on the flexible cable.

7. The liquid crystal display device according to claim 6, wherein the flexible cable is coupled to a printed circuit board disposed on the flank of the lower mold.

8. The liquid crystal display device according to claim 6, wherein the fluorescent lamps are cold-cathode fluorescent lamps shaped like the letter L.

9. A liquid crystal display device comprising:

a liquid crystal display panel placed on an upper mold;

a liquid crystal shutter disposed behind the upper mold and stored in a lower mold; and fluorescent lamps disposed in the lower mold, wherein:

the liquid crystal shutter is set to a mode in which the liquid crystal shutter becomes cloudy to scatter light;

the liquid crystal shutter is set to a mode in which the liquid crystal shutter transmits light;

the cables for the fluorescent lamps are put in a groove formed in the upper part of the lower mold;

the upper part of the lower mold has a notched portion; and a flexible cable is coupled to the liquid crystal shutter, the flexible cable is extended to outside through the notched portion of the upper part of the lower mold, and the flexible cable is interposed between the cables for the fluorescent lamps and the lower mold.

10. The liquid crystal display device according to claim 9, wherein the flexible cable is coupled to a printed circuit board disposed on the flank of the lower mold.

11. The liquid crystal display device according to claim 9, wherein the fluorescent lamps are cold-cathode fluorescent lamps shaped like the letter L.

\* \* \* \* \*